Patented July 21, 1942

2,290,710

UNITED STATES PATENT OFFICE 2,290,710

MORPHOLINE PERIODIDE

Robb V. Rice, Hasbrouck Heights, N. J., and George D. Beal, Pittsburgh, Pa., assignors to Gane and Ingram, Inc., New York, N. Y., a corporation of New York No Drawing. Application March 15, 1940, Serial No. 324,086

4 Claims. (Cl. 167—58)

This invention pertains to iodine compounds for medicinal and other applications, and its principal object is to provide such a compound which is capable of slowly liberating free iodine in the presence of moisture for treating fungus and like growths as well as bacterial infections of body tissues without injuring the tissues.

Considerable difficulty has been experienced in developing an inexpensive and harmless yet effective treatment for certain body fungus infections, such for example as that commonly termed "athlete's foot." Although iodine has long been recognized as one of the most effective fungicidal medicines known, its use as such has heretofore met with little success, since materials previously developed for this treatment are either incapable of liberating free iodine under conditions encountered in external body applications, or alternatively, provide this element in such high concentration initially or by too rapid liberation thereof, as to injure the skin and body tissues by corrosive action.

For example, iodine solutions, such as tincture of iodine, if of sufficient strength to be effective, provide too high concentration of free iodine, and hence injure the tissues. The same is true of inorganic iodine compounds which are capable of producing free iodine under the conditions encountered for external body application, inasmuch as such inorganic compounds liberate iodine almost instantaneously in the presence of moisture. On the other hand, the known types of organic iodine compounds which have been shown to possess some bactericidal activity, such for example as iodoform, tetraiodopyrrole, diiodopiperazine, iodine derivatives of hexamethylenetetramine, etc., are all limited to use as a source of iodine for internal administration, because none will liberate iodine when applied externally. Any bactericidal activity present under these conditions is a result of the properties of the compound as a whole and is not due to liberation of free iodine. None of the organic compounds aforesaid is particularly effective as a fungicidal agent.

The problem of preparing a suitable fungicidal agent is, therefore, one of providing a material capable of gradually liberating free iodine under the conditions of moisture, etc., encountered in external body application, and at such a rate as to produce an iodine concentration insufficient to cause harmful corrosive action on the body tissues but sufficient to effect pronounced fungicidal or bactericidal activity. Organic iodine compounds in which the iodine is bound to a carbon atom are not suitable, since such chemicals are either too stable to liberate iodine under the conditions stated, or do so only in the form of hydriodic acid in which the iodine is combined with a hydrogen atom, and hence results in chemical activity of entirely different characteristics from those of free iodine. And although it is known that iodine will combine with the nitrogen atom of certain nitrogen compounds, particularly the nitrogen of an amino group, to form rather easily decomposable iodine compounds, such compounds of this type as have heretofore been known are nevertheless either too stable to liberate free iodine under the conditions encountered in external body application or for other reasons are not suitable to be used in therapeutic preparations. In most of the known compounds of this type, the iodine substitutes for hydrogen on the nitrogen atom so that a further substitution of some other element for iodine is required to liberate the latter. That is to say, free iodine will not be liberated on mere exposure to external body conditions.

We have discovered, however, in accordance with the basic concept of the present invention, that in the case of morpholine, iodine may be combined with the nitrogen atom by direct addition thereto, rather than by substitution for hydrogen, and that the iodine thus combined will be slowly liberated again as free iodine, in aqueous solution or in the presence of moisture, such as is encountered in external body application. This iodine-morpholine addition product is, therefore, ideally adapted to the treatment of fungus growths and the like, inasmuch as the iodine is liberated at a sufficiently slow rate to kill the fungus growth without injuring the body tissues.

More particularly in accordance with the invention, we have discovered that if morpholine is allowed to react with iodine in a suitable solvent, as for example an aqueous solution of potassium iodide, that an orange-red, crystalline precipitate is formed which, on separation and analysis, is found to have the formula:

(1)

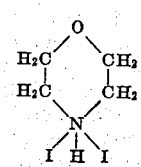

and which, accordingly, following the accepted nomenclature, is morpholine periodide. This compound results from the following addition reaction of morpholine and iodine:

(2) 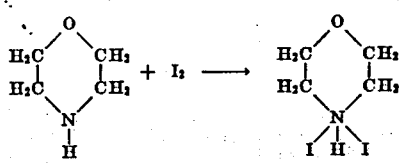

It will be observed that in accordance with this reaction, two atoms of iodine combine by addition with each molecule of morpholine to form the resulting addition product, morpholine periodide. In so far as I am aware, it has not heretofore been known that iodine would combine with morpholine, or that an addition product, such as morpholine periodide, would result. This compound, therefore appears to be new.

The new compound, morpholine periodide, has, as would be expected, properties quite different from those of the compounds referred to above in which an iodine atom substitutes for hydrogen on a nitrogen atom. For example, in the presence of water or moisture, the new compound, viz., the periodide, gradually decomposes with the liberation of free iodine. This is evident from the characteristic iodine odor produced. When starch-iodide paper is immersed in water containing the new compound, the paper immediately turns blue, thereby establishing the presence of free iodine in the water, the latter being liberated from the morpholine periodide.

Although the morpholine periodide gradually decomposes in the presence of water or moisture, it is sufficiently stable to be prepared in the manner above described. The precipitate formed, however, should be dried as rapidly as possible to prevent the liberation of iodine and, when dried, it is perfectly stable so long as it is kept in a closed container.

For treating fungus growths and the like, the new compound may be applied to the skin as such or incorporated in a suitable ointment base, dusting powder, solution or other form of pharmaceutical preparation without causing irritation and corrosive action characteristic of free iodine. The natural secretion of perspiration through the skin produces sufficient moisture to liberate free iodine from the morpholine periodide when it is placed on the body, and the iodine is liberated in sufficient concentration to kill bacteria and fungi without harming the body tissues. Within certain limitations, the new compound can be incorporated into any preparation that is used to produce a germicidal or fungicidal action. These limitations consist in preparations which contain water, alcohol, acetone and similar substances that will react with the compound. Morpholine periodide may also be used for internal administration where a systemic iodine effect is desired. The compound can be administered as such or in combination with other materials which do not react before medication is effected.

The new compound morpholine periodide may also be used for purposes other than medicinal. Due to the fact that the iodine in its structure is loosely bound and easily removable, the compound will serve as a source of iodine in chemical reactions where it is desirous to combine iodine with some other substance. For example, morpholine periodide when heated with ethyl alcohol produces iodoform, and it combines with acetone to produce iodoacetone.

Various methods may be employed in preparing morpholine periodide from morpholine and iodine. Elementary iodine may be added to morpholine in the absence of any solvent, whereupon a reaction occurs to produce morpholine periodide. However, this mode of preparation is subject to the objection that the morpholine periodide formed in the reaction produces a coating on the particles of iodine immersed in the morpholine, and thus noticeably hinders the reaction from proceeding to completion.

The compound is best prepared by using some solvent to dissolve the iodine and the morpholine, among which may be mentioned methyl or ethyl alcohol, acetone and water. If water is used, potassium iodide must be dissolved in the portion reserved for making the solution of iodine to be added to the solution of morpholine or vice versa. The above solvents are mentioned by way of example only and other suitable solutions may be employed.

Water containing potassium iodide as the iodine solubilizing agent, is a very effective solvent in conducting the reaction, since the morpholine periodide formed does not react with the water to form any secondary and undesirable compounds, such as is the case when certain other solvents are used. For example, when ethyl alcohol or a mixture of ethyl alcohol and water is used, appreciable quantities of iodoform are produced by secondary reactions, and the iodoform thus produced contaminates the morpholine periodide to such an extent that its removal is difficult.

On the other hand, when iodine is dissolved in an aqueous solution of potassium iodide, and this solution is added to the morpholine dissolved in water, orange-red, crystalline morpholine periodide soon begins to separate from the solution and continues to do so until one or both of the reactants has been entirely consumed. The same action occurs if the order of addition is reversed and the morpholine solution is added to the iodine solution. The precipitate formed may be filtered off on a Buchner funnel, washed thoroughly with water, and dried at room temperature or slightly above, preferably under vacuum, since exposure to air while moist causes morpholine periodide to darken due to liberation of iodine. When the material is thoroughly dried, it may, as stated, be stored in glass containers indefinitely without appreciable decomposition.

As a specific example of the new compound, we give the following:

A solution of iodine is prepared by dissolving 965 grams of iodine in a solution composed of 1800 cc. of water and 1800 grams of potassium iodide. This solution is then added dropwise to 340 grams of morpholine dissolved in 3000 cc. of water during constant stirring. Soon after the addition of iodine is begun, fine, orange-red crystals of morpholine periodide start to separate and more of the compound continually crystallizes out as more iodine is added. When all the iodine has been introduced, stirring is stopped and the precipitate of morpholine periodide is filtered off, washed with 1500 cc. of water and pressed as dry as possible. The filter cake is then removed and dried in a vacuum desiccator over calcium chloride at a pressure of about 50 mm. for three days. The yield is 1250–1275 grams of morpholine periodide, or 96–98 per cent. of the calculated amount. Iodine analysis: 74.71 per cent.; calculated—74.38 per cent.

For external application, the new compound may be employed as such in powder form, or in aqueous, alcoholic, etc., solution, or incorporated in a dusting powder or in a suitable ointment base, etc. When used in a dusting powder for example, it may be combined with powdered talc in the ratio of about 90 parts by weight of powdered talc to 10 parts by weight of the crystalline morpholine periodide, although these proportions are not critical. In general, the proportions are to be determined by the strength of the medicinal action required.

An excellent salve containing the morpholine periodide is obtained by incorporating 10 parts by weight of this ingredient in 90 parts by weight of a polyglycol wax of the proper consistency, for example, "Carbowax 1500," a product of Carbide and Carbon Chemicals Corporation. Such an ointment base is especially adapted for fungus growth treatments in conjunction with the morpholine periodide, because it is water-soluble and also because it facilitates the liberation of free iodine from the morpholine periodide in the presence of moisture. Another desirable feature is that the morpholine periodide goes into solution in this ointment base, in contrast to its substantial insolubility in other common ointment bases, such as petrolatum, lard, lanolin, etc. The consistency of the ointment base can of course be varied by controlling the extent to which polymerization is carried. Also if any given batch is too firm or viscous, it can be conveniently thinned down to the desired consistency by the addition of such agents as glycerine, Cellosolve, etc., the former being preferred. The quantity of the thinning agent added will of course depend upon the consistency of the original ointment base and the consistency of the product desired. The consistency as manufactured is usually varied somewhat throughout the year in accordance with seasonal variations in temperature.

We claim:

1. A therapeutic agent for releasing elemental iodine comprising, morpholine periodide in a non-aqueous and non-reacting dispersing medium.

2. A therapeutic agent for releasing elemental iodine comprising, morpholine periodide in a non-aqueous and non-reacting liquid dispersing medium.

3. A therapeutic agent for releasing elemental iodine comprising, morpholine periodide in a non-aqueous and non-reacting ointment base.

4. A therapeutic agent for releasing elemental iodine comprising, an anhydrous powder comprising morpholine periodide and a non-reacting dispersing agent.

ROBB V. RICE.
GEORGE D. BEAL.